Oct. 3, 1933.                H. MUIR                1,928,732
              LOCOMOTIVE DRIVER BRAKE INDICATOR
                 Filed Dec. 5, 1930        2 Sheets-Sheet 1
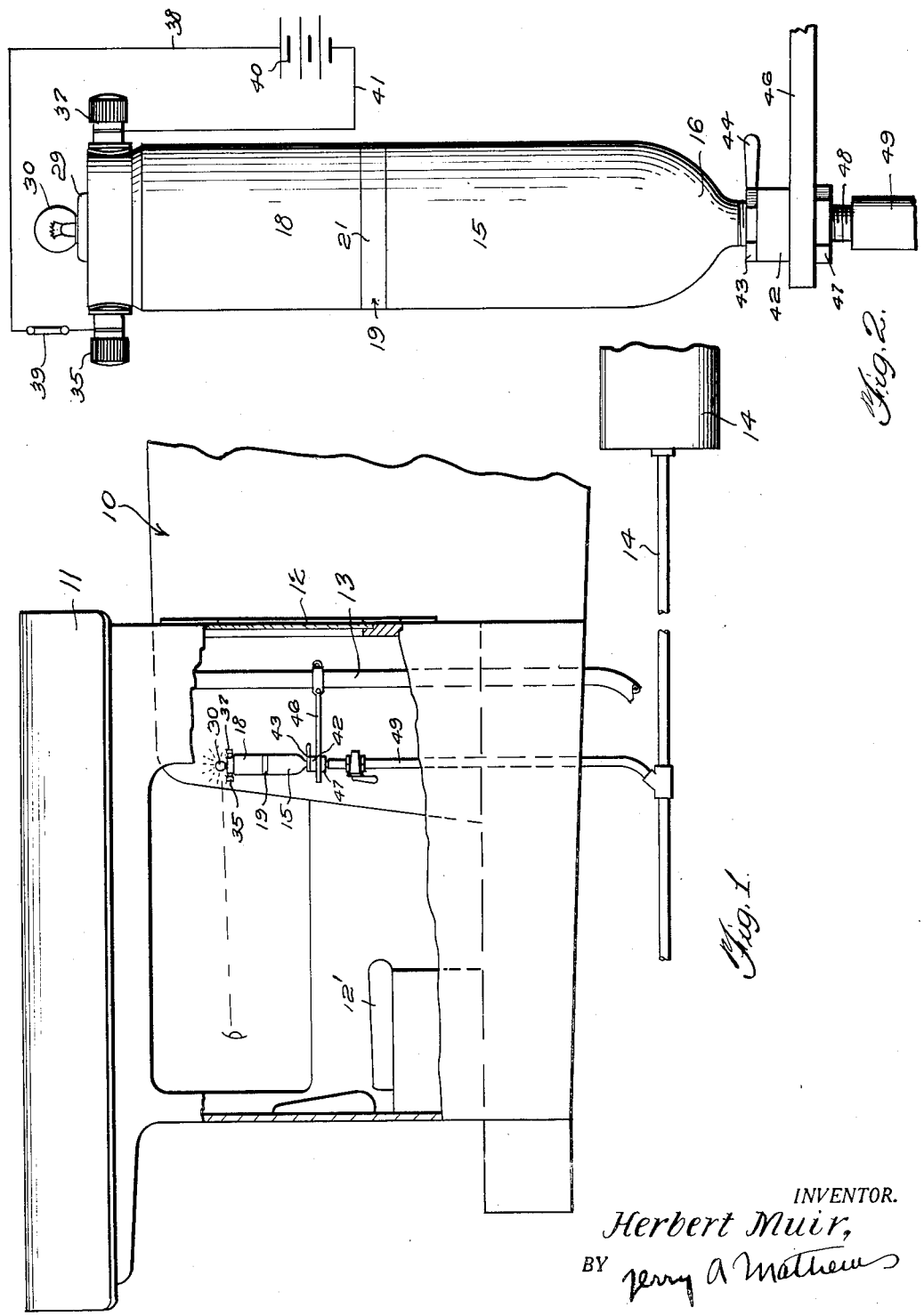
INVENTOR.
Herbert Muir,
BY Jerry A Mathews
ATTORNEY.

Oct. 3, 1933.  H. MUIR  1,928,732
LOCOMOTIVE DRIVER BRAKE INDICATOR
Filed Dec. 5, 1930  2 Sheets-Sheet 2
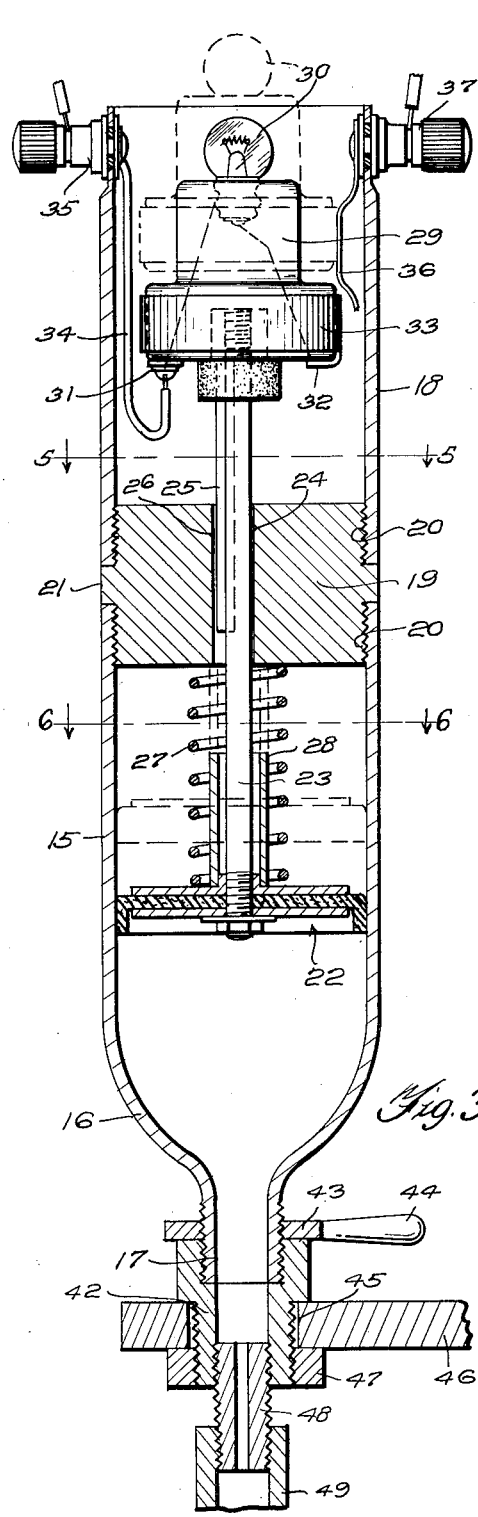
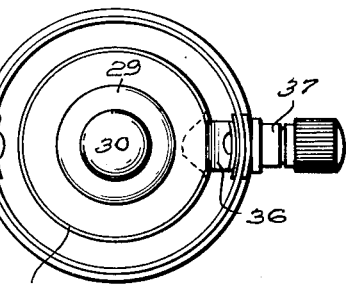
Fig. 4.
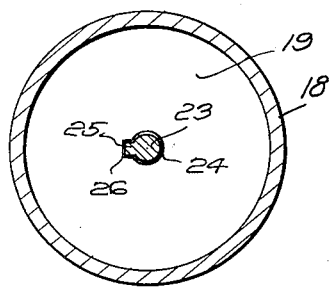
Fig. 5.
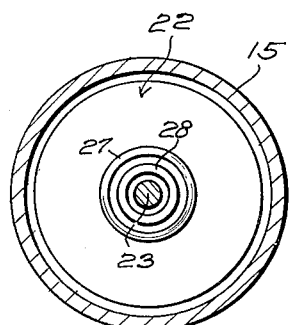
Fig. 6.
INVENTOR.
Herbert Muir,
BY Jerry A Mathews
ATTORNEY.

Patented Oct. 3, 1933

1,928,732

UNITED STATES PATENT OFFICE 1,928,732

LOCOMOTIVE DRIVER BRAKE INDICATOR

Herbert Muir, Louisville, Ky.

Application December 5, 1930. Serial No. 500,368

3 Claims. (Cl. 177—311)

My invention relates to a device for indicating the extent of air pressure within the driving brake cylinder of a railway locomotive.

As is well known, railway locomotives have drivers or wheels which are equipped with tires. These tires are, ordinarily, applied to the drivers in a heated condition and are allowed to shrink thereon by cooling, and are retained upon the drivers entirely by virtue of the clamping engagement between the parts. It frequently happens that the engineer, upon making a train line reduction, and after releasing the train line brakes, fails to release the driver brakes upon the locomotive. As a result of this, the engine is driven with the driver brakes set, and this produces excessive friction between the brakes and the tires, so that the tires become heated and expand, and work loose from the drivers. The tires frequently work entirely off of the wheel centers of the drivers causing derailment of the engine, or other accidents or delays. This necessitates the re-setting of the same tires upon the wheel centers, or the application of new tires, which causes considerable delay, and frequently will tie up traffic for a long period.

In accordance with my invention, I provide an indicator or signal device which is pressure actuated, and is placed into communication with the driver brake cylinder mounted upon the locomotive. As soon as the air pressure enters the driver brake cylinder, to actuate the driver brakes, the signal device is actuated, indicating this condition, and will remain in the active condition until the pressure is reduced in the driver brake cylinder, to a selected point, whereby the brakes cannot produce excessive frictional engagement with the tires. Should the engineer fail to release the pressure from within the driver brake cylinder, and, hence release the driver brakes, my device will immediately indicate this condition to him. The indicator or signal device is located within the cab of the locomotive, and is, preferably, disposed behind the front window of the cab, in the line of vision of the engineer.

In the accompanying drawings, forming a part of this specification, and in which like numerals are employed to designate like parts throughout the same, Figure 1 is a side elevation of a signal device or indicator, embodying my invention, showing the same applied to a railway locomotive, Figure 2 is a side elevation of the device, removed, Figure 3 is a central vertical longitudinal section through the device, Figure 4 is a plan view of the same, Figure 5 is a transverse section taken on line 5—5 of Figure 3, Figure 6 is a similar view taken on line 6—6 of Figure 3.

In the drawings, wherein for the purpose of illustration is shown a preferred embodiment of my invention, the numeral 10 designates a railway locomotive as a whole, having a cab 11, provided with a front window 12. The numeral 13 designates the injector feed pipe. The numeral 14 designates a pressure supply pipe leading to the driver brake cylinder, 14'.

The signal device or indicator embodies a lower cylinder or casing 15, which is vertically arranged, and has its lower end portion 16 tapering downwardly and terminating in a cylindrical reduced neck 17, which is exteriorly screw-threaded, as shown. The numeral 18 designates an upper cylinder or casing, which is vertically arranged, and disposed in end to end relation to the lower cylinder 15. The numeral 19 designates a middle cylinder head or coupling plug, which is cylindrical, and has screw-threaded end portions 20, engaging within the screw-threaded inner ends of the cylinders 15 and 18. The coupling plug has an annular flange 21, disposed between the screw-threaded portions thereof, and this flange is arranged between the ends of the cylinders 15 and 18, and is adapted to have clamping engagement therewith, and its periphery is flush with the peripheries of the cylinders 15 and 18, as shown.

Mounted to reciprocate within the cylinder 18 is a plunger 22, of any well known or preferred type, and this plunger is rigidly attached to the lower end of a reciprocatory rod 23, slidable within an opening 24, formed in the coupling plug 19. The rod carries a radial, longitudinal guide key 25, sliding in a radial slot 26, formed in the plug 19. This arrangement prevents the rod 23 from turning upon its longitudinal axis, while it is free to move longitudinally. The upward movement of the plunger 22 is opposed by a compressible coil spring 27, which surrounds the rod 23, and engages the top of the plunger 22, and the plug 19. It is preferred that this spring be of such a strength that it will be compressed when the pressure within the driver brake cylinder exceeds one-quarter of a pound. Means are provided to limit the upward movement of the plunger 22, comprising a stop sleeve 28, which surrounds the rod 23, as shown.

The numeral 29 designates the insulating body portion of a socket, formed of porcelain, or the like, which is suitably rigidly mounted upon the top of the rod 23, to travel therewith, and this socket operates within the upper cylinder 18. The socket receives an electric bulb 30. The socket has a binding post 31, in electrical connection with one terminal of the bulb 30, and a second post 32, in electrical connection with the opposite terminal of the bulb. The post 32 is connected with a contact ring 33, mounted upon the lower portion of the insulating socket. A flexible wire 34 is connected to the binding post 31, and with a binding post 35. A stationary resilient contact 36 is arranged to engage with a contact ring 33, when it is raised. This contact ring 33 is rigidly mounted upon the lower portion of the body portion 29. This contact 36 is connected with a binding post 37. The binding post 35 is connected in a circuit, including a wire 38, preferably having a switch 39, connected therein. The wire 38 is connected with one pole of a source of current 40, the opposite pole of which is connected with a wire 41, which is connected with the binding post 37. It is, thus, seen that when the plunger 22 is elevated, contact ring 33 will engage contact 36, and a circuit will be closed to cause the bulb 30 to glow. The arrangement of the contact ring 33 and contact 36 is such that when the plunger 22 is in the lowermost position, the circuit is broken between these contacts, but as soon as the plunger rises for a slight distance, the circuit is closed, and remains closed during the entire upward travel of the plunger. Hence, the bulb 30 is glowing before it is projected above the top of the cylinder 18, and continues to glow while in the raised position.

The lower end of the lower cylinder 15 is placed into communication with the pipe 14, and the reduced neck 17 has screw-threaded engagement within the upper end of a combined supporting and connecting tubular coupling 42. A lock nut 43 is also carried by the neck 17, and may be turned by a handle 44, or the like. The tubular coupling 42 extends through an opening 45, formed in a horizontal supporting bracket 46, which is clamped to the injector feed pipe 13. A nut 47 is screwed upon the lower end of the coupling 42, for clamping engagement with the bracket 46. A choke coupling element 48 leads into the lower end of the coupling 42, and into the upper end of a pipe 49, which is connected with the pipe 14. The function of the choke coupling is to retard the passage of the air pressure from the pipe 49 into the cylinder 15, so that the plunger 22 will not be actuated too rapidly.

As clearly shown in Figure 1, the signal device or indicator is vertically disposed at the rear of the front window 12, in front of the engineer's seat 12'. I prefer to arrange the device at such an elevation that the top of the device is in substantial alignment with the line of vision of the engineer.

The operation of the device is as follows:

When the driver brakes are completely released, the pressure within the driver brake cylinder upon the locomotive, is reduced to atmospheric pressure. Under these conditions, the plunger 22 is in the lowermost position, and the bulb 30 is at an elevation beneath the top of the cylinder 18. Should the engineer reduce the pressure in the train line, for applying the train line brakes, and subsequently release the train line brakes, but fails to release the driver brakes, pressure will remain within the driver brake cylinder upon the locomotive, and the plunger 22 will remain elevated, so that the bulb 30 will be elevated to the visible position, and will be made to glow. The engineer is, thus, apprised of the fact that the driver brakes are still set, and will then release the same, subsequently to which the bulb 30 will be lowered within the cylinder 18. The cylinder 18 serves as a housing for the bulb 30, covering the same from vision when the driver brakes are released, and also protecting the bulb. The bulb 30 functions as a movable signal as well as an illuminated signal, and should the bulb circuit fail, the bulb will still function as a movable visual signal. It is obvious that the invention is not, necessarily, restricted to the use of an electric bulb, as a visual signal, nor is it, necessarily, restricted to a visual signal, as an audible signal may be employed. Audible signals may be of various types, such as a bell, a whistle, or the like, and different visual signals may be used, such as a board.

As far as I am aware, I am the first to conceive the idea of a signal device actuated by pressure within the driver brake cylinder of the locomotive, for indicating when the driver brakes are set, independently of the train brakes. This combination will, therefore, be claimed broadly.

It is to be understood that the form of my invention herein shown and described is to be taken as the preferred example of the same, and that various changes in the shape, sizes and arrangement of parts may be resorted to without departing from the spirit of my invention, or the scope of the subjoined claims.

Having described my invention, I claim:

1. A visual signal device being adapted for use in the cab of a railroad locomotive for indicating the presence of air pressure within the driving brake cylinder, comprising a substantially vertically arranged cylinder having an inlet near its lower end, an apertured guide element arranged within the substantially vertical cylinder, a plunger rod slidably mounted within the aperture of the guide element, a plunger arranged within the cylinder beneath the guide element and connected to the plunger rod and moved upwardly by pressure passing through the inlet, a spring surrounding the plunger rod beneath the guide element and serving to force the same downwardly when the pressure within the cylinder falls below a selected point, a rigid sleeve surrounding the plunger rod beneath the guide element and adapted to be shifted upwardly into engagement with the guide element to positively define the extent of upward movement of the plunger rod, a socket device adapted to be mounted within the upper portion of the substantially vertical cylinder and carried by the plunger rod to move therewith, an electric bulb mounted upon the socket device, the arrangement being such that the electric bulb is within the substantially vertical cylinder when the plunger is in the lowermost position and projects for only a short distance above the substantially vertical cylinder when the plunger is in the uppermost position, and means to cause the bulb to glow when in the raised position.

2. A visual signal device being adapted for use in the cab of a railroad locomotive for indicating the presence of air pressure within the driving brake cylinder, comprising a substantially vertical cylinder having an inlet near its lower end, a guide element mounted within the cylinder and serving to divide the cylinder into upper and lower sections and provided with an opening, a plunger rod slidably mounted within the opening and splined to the guide element so that the plunger rod is held against turning movement upon its longitudinal axis, a plunger secured to the lower end of the plunger rod, a spring surrounding the plunger rod and positioned between the guide element and the plunger and serving to force the plunger downwardly, means coacting with the guide element to positively define the extent of upward movement of the plunger rod, a socket device carried by the upper end of the guide rod and arranged within the upper section of the substantially vertical casing, an electric bulb carried by the socket device, the arrangement being such that the bulb is at an elevation beneath the top of the substantially vertical casing when the plunger is in the lowermost position and is projected slightly above the top of the same when the plunger is in the uppermost position, and means to cause the bulb to glow when the same is in the raised position, including a contact carried by the socket device and a contact carried by the upper portion of the substantially vertical cylinder, said contacts being maintained in alignment by the splined engagement between the plunger rod and the guide element.

3. A visual signal device being adapted for use in the cab of a railroad locomotive for indicating the extent of air pressure within the driving brake cylinder, comprising a lower cylinder section having an inlet near its lower end, an upper cylinder section, a plug having screw-threaded ends engaging within the adjacent ends of the upper and lower cylinder sections and serving to rigidly connect them, said plug having an opening formed therein, a plunger rod passing through the opening of the plug and projecting above and below the same, means for effecting a splined engagement between the plunger rod and plug so that the plunger rod is free to move longitudinally and held against turning movement upon its longitudinal axis with relation to the plug, a plunger arranged within the lower cylinder section and attached to the lower end of the plunger rod, a compressible coil spring surrounding the plunger rod within the lower cylinder section and arranged between the plug and the plunger, a stop element carried by the plunger rod beneath the plug and adapted to cooperate with the plug to accurately define the extent of upward movement of the plunger by the pressure within the lower cylinder section, a socket device arranged within the upper central section and carried by the upper end of the plunger rod, a bulb carried by the socket device, the arrangement being such that the bulb is at an elevation beneath the top of the upper cylinder section when the plunger is in the lowermost position and is projected slightly above the top of the upper cylinder section when the plunger is in the uppermost position, and means to cause the bulb to glow when shifted to the raised position, including a contact carried by the socket device and a contact carried by the upper end of the upper cylinder section, said contacts being maintained in alignment by the splined engagement of the plunger rod with the plug.

HERBERT MUIR.